(12) United States Patent
Kadono et al.

(10) Patent No.: US 11,585,414 B2
(45) Date of Patent: Feb. 21, 2023

(54) CHAIN DRIVE MECHANISM

(71) Applicant: TSUBAKIMOTO CHAIN CO., Osaka (JP)

(72) Inventors: Takahiro Kadono, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 465 days.

(21) Appl. No.: 16/662,344

(22) Filed: Oct. 24, 2019

(65) Prior Publication Data

US 2020/0166105 A1 May 28, 2020

(30) Foreign Application Priority Data

Nov. 28, 2018 (JP) .............................. JP2018-222582

(51) Int. Cl.
*F16H 7/18* (2006.01)
*F16H 7/06* (2006.01)
*F16G 13/04* (2006.01)
*F16G 13/06* (2006.01)

(52) U.S. Cl.
CPC .............. *F16H 7/18* (2013.01); *F16G 13/04* (2013.01); *F16G 13/06* (2013.01); *F16H 7/06* (2013.01)

(58) Field of Classification Search
CPC ... F16H 7/18; F16H 7/06; F16H 55/30; F16H 2055/306; F01L 1/022; F16G 13/04; F16G 13/06
USPC .......................................... 474/155, 156, 157
See application file for complete search history.

(56) References Cited

U.S. PATENT DOCUMENTS

| | | | | |
|---|---|---|---|---|
| 3,377,875 A | * | 4/1968 | Sand | F16H 7/06 474/462 |
| 3,495,468 A | * | 2/1970 | Griffel | F16H 7/06 474/462 |
| 4,758,209 A | * | 7/1988 | Ledvina | F16H 55/30 474/212 |
| 5,267,910 A | | 12/1993 | Maruyama et al. | |
| 5,453,059 A | * | 9/1995 | Avramidis | F01L 1/024 474/212 |
| 6,334,829 B1 | * | 1/2002 | Saito | F16H 7/06 474/213 |

(Continued)

FOREIGN PATENT DOCUMENTS

| | | |
|---|---|---|
| JP | S49-120071 A | 11/1974 |
| JP | H05-79087 U | 10/1993 |

(Continued)

*Primary Examiner* — Gene O Crawford
*Assistant Examiner* — Emily R Kincaid
(74) *Attorney, Agent, or Firm* — WHDA, LLP

(57) ABSTRACT

To provide a simple-structured chain drive mechanism that can reduce the noise generated when the chain sits on the sprocket, prevent deterioration of power transmission efficiency, and retard the progress of wear on the sprocket or chain. The chain drive mechanism includes a sprocket having a plurality of teeth, and a chain having a plurality of link plates and configured to be put around the sprocket. The sprocket includes a pair of flanges protruding circumferentially around the sprocket such as to sandwich the plurality of teeth from sides. The chain includes a pair of seat portions on both sides of the chain so that the flanges abut on the seat portions from a circumferential direction of the sprocket when the chain sits.

3 Claims, 4 Drawing Sheets

(56) References Cited

U.S. PATENT DOCUMENTS

| | | | |
|---|---|---|---|
| 2003/0087714 A1 | 5/2003 | Todd | |
| 2005/0119079 A1 | 6/2005 | Okabe | |
| 2006/0240925 A1 | 10/2006 | Todd | |
| 2008/0312017 A1* | 12/2008 | Young | F16H 55/30 474/160 |
| 2010/0151978 A1* | 6/2010 | Todd | F16H 55/30 474/152 |
| 2011/0009221 A1* | 1/2011 | Ogo | F01L 1/053 474/213 |
| 2018/0180156 A1 | 6/2018 | Koller et al. | |

FOREIGN PATENT DOCUMENTS

| | | |
|---|---|---|
| JP | 2003-184996 A | 7/2003 |
| JP | 2005-163806 A | 6/2005 |
| JP | 2018-062941 A | 4/2018 |

\* cited by examiner

CHAIN DRIVE MECHANISM

BACKGROUND OF THE INVENTION

1. Field of the Invention

The present invention relates to a chain drive mechanism that includes a plurality of sprockets and a chain put around the sprockets.

2. Description of the Related Art

Chain drive mechanisms that use a chain such as a roller chain or a silent chain put around a plurality of sprockets are known and have been used in wide applications such as power transmission, synchronized rotation, changing of rpm or torque and the like.

A silent chain, for example, is generally made up of a large number of link plates each having a pair of teeth and a pair of pin holes, these link plates being bendably coupled with connecting pins inserted in the pin holes. The endless silent chain is put around a plurality of sprockets in the chain drive mechanism, so that the teeth of the link plates mesh with the teeth of the sprockets to transmit rotation.

In such a chain drive mechanism, when each link plate moves onto a sprocket from the free span of the silent chain, the tooth of each link plate first abuts and meshes with the teeth of the sprocket, and as the silent chain moves on around the sprocket and bends, the links sit on the teeth of the sprocket. All of the link plates repeat these actions in cycles at high speed during the rotation, and it is desired to reduce the noise generated by these meshing and sitting actions.

For example, a chain drive mechanism (chain and sprocket system) that includes a chain (80) having a plurality of pairs of links (82) coupled together with pins (84), and one or more generally circular sprocket(s) (30, 100) provided on a cam shaft and having a plurality of circumferentially spaced teeth (32, 102), with tooth roots (34) for receiving the pins (84) between adjacent teeth (32, 102), is known from Japanese Patent Application Laid-open No. 2003-184996. Each tooth root (34) has a tooth root radius (R2 or R3) that is the distance from the center of the sprocket (30, 100) to a point on the tooth root (34) radially closest to the center of the sprocket (30, 100). At least one of the tooth roots (34) has a second tooth root radius (R2) that is smaller than the first tooth root radius (R3). The system features a particular pattern of arrangement of first and second tooth root radii (R3, R2) effective for redistributing the tension applied on a chain (80) so that the entire tension that acts on the chain (80) during the operation of the system is reduced.

The sprocket (30, 100) of this chain drive mechanism (chain and sprocket system) known from Japanese Patent Application Laid-open No. 2003-184996 has the tooth roots (34) with different root circle radii arranged in a particular pattern of repeated cycles that effectively makes the meshing impact irregular to reduce the noise.

This arrangement can also reduce the maximum tension of the chain as compared to a sprocket having a pattern of arrangement of tooth roots (34) that is random and not a particular pattern of repeated cycles.

SUMMARY OF THE INVENTION

However, this chain drive mechanism known from Japanese Patent Application Laid-open No. 2003-184996 still has the scope of improvement.

Namely, the tooth roots of the sprocket vary in root circle radius so that there are differences in pitch radius when the silent chain sits on the sprocket, which causes large rotation fluctuations of the chain and could deteriorate power transmission efficiency.

Also, the wear on tooth surfaces tends to progress fast because the meshing between the sprocket and chain and the seating of the chain on the sprocket take place on the same tooth surfaces.

The present invention solves these problems and it is an object of the invention to provide a simple-structured chain drive mechanism that can reduce the noise generated when the chain sits on the sprocket, minimize rotation fluctuations of the chain to prevent deterioration of power transmission efficiency, and retard the progress of wear on the sprocket or chain.

To solve the problems above, the chain drive mechanism according to the present invention includes a sprocket having a plurality of teeth, and a chain having a plurality of link plates and configured to be put around the sprocket, the sprocket including a pair of flanges protruding circumferentially around the sprocket such as to sandwich the plurality of teeth from sides, and the chain including a pair of seat portions on both sides of the chain so that the flanges abut on the seat portions from a circumferential direction of the sprocket when the chain sits.

According to one aspect of the present invention, the sprocket includes a pair of flanges protruding circumferentially around the sprocket such as to sandwich the plurality of teeth from sides, and the chain includes a pair of seat portions on both sides of the chain. The flanges bring their restricting guides into contact with the seat portions from a circumferential direction of the sprocket to allow the chain to sit at the seat portions. The chain can therefore sit on the sprocket without touching the teeth of the sprocket but with the seat portions abutting on the restricting guides. Therefore, when a sprocket having tooth roots with various different root circle radii is used, the pitch radius will be constant when the chain is seated, whereby rotation fluctuations of the chain are minimized and a decrease in power transmission efficiency can be prevented.

Since the chain and the sprocket contact each other at different points when meshing and sitting, wear on the tooth surfaces can be retarded.

According to another aspect of the present invention, the chain includes pins that couple the plurality of link plates together rotatably, and the seat portions are both ends of the pins. Since there is no need to provide an additional component to cause the chain to abut on the flange, an increase in the cost can be avoided.

According to another aspect of the present invention, the seat portions are link plates located opposite the flanges. Since there is no need to provide an additional component to cause the chain to abut on the flange, an increase in the cost can be avoided.

According to another aspect of the present invention, the plurality of teeth of the sprocket include teeth with different shapes. Noise and vibration generated when the chain meshes with the sprocket can be reduced without changing the configuration of the conventional chain.

According to another aspect of the present invention, the chain is a silent chain, and the plurality of link plates include link plates having teeth with different shapes. Noise and vibration generated when the chain meshes with the sprocket can be reduced without changing the configuration of the conventional chain.

DESCRIPTION OF THE PREFERRED EMBODIMENTS

Hereinafter, a chain drive mechanism according to one embodiment of the present invention will be described with reference to the drawings.

Figure 1:
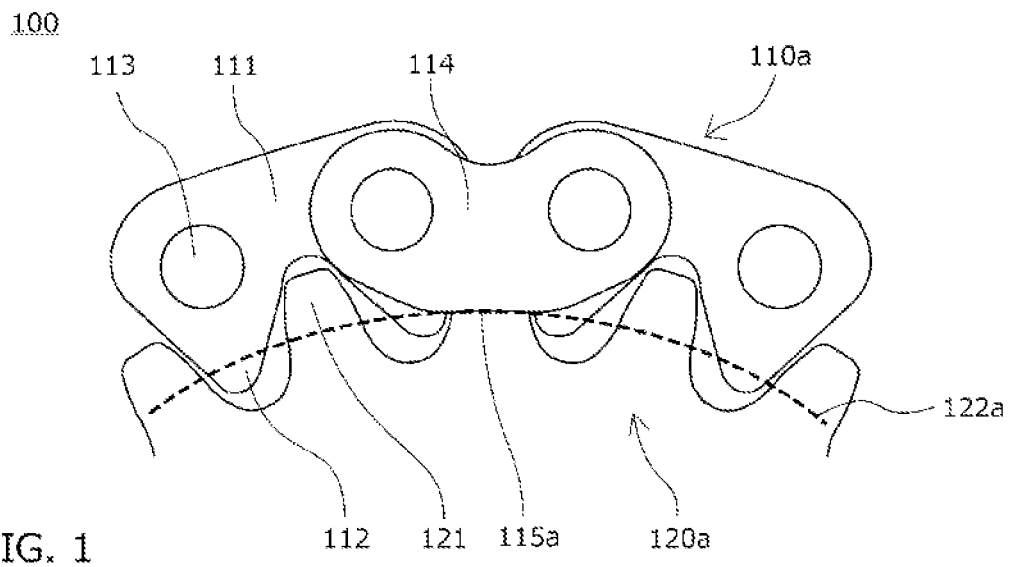
FIG. 1 is a side view illustrating a connecting link plate 114 of a chain 110a sitting on a flange 122a of a sprocket 120a in a chain drive mechanism 100 according to one embodiment of the present invention.
Figure 2:
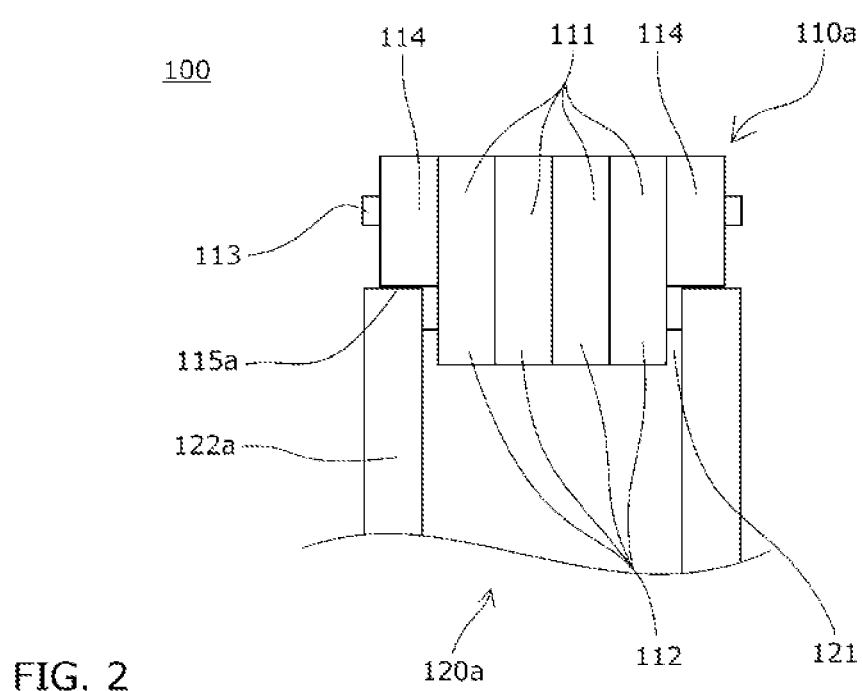
FIG. 2 is a schematic cross-sectional front view illustrating connecting link plates 114 of the chain 110a sitting on flanges 122a of the sprocket 120a in the chain drive mechanism 100 according to one embodiment of the present invention.

The chain drive mechanism 100 that is one embodiment of the present invention includes a sprocket 120a having a plurality of teeth 121, and a chain 110a having a plurality of meshing link plates 111 and connecting link plates 114 and put around the sprocket 120a, as shown in FIG. 1 and FIG. 2.

The sprocket 120a includes a pair of flanges 122a protruding circumferentially around the sprocket 120a to sandwich the plurality of teeth 121 from both sides.

The chain 110a is a silent chain having a plurality of meshing link plates 111 and a plurality of connecting link plates 114 alternately arranged and offset by half a pitch along the longitudinal direction of the chain, and bendably coupled together with connecting pins 113.

The meshing link plate 111 has two teeth 112 in the lower part side by side along the longitudinal direction of the chain.

The connecting link plate 114 has a seat portion 115a in the lower part.

The distance between the inner side faces of the opposite flanges 122a of the sprocket 120a is set larger than the distance between the inner side faces of the opposite connecting link plates 114 of the chain 110a. The sprocket is configured such that, when the chain 110a is put around the sprocket 120a, the distance between the seat portion 115a and the flange 122a is shorter than the distance between the tooth 112 and its seating point on the tooth 121.

Next, the state of engagement between the chain 110a and the sprocket 120a when the chain drive mechanism 100 of the present invention is in action will be described with reference to FIG. 1 and FIG. 2.

When a meshing link plate 111 of the chain 110a moves onto the sprocket 120a from the free span, the tooth 112 of the meshing link plate 111 contacts and meshes with the teeth 121 of the sprocket 120a.

As the chain 110a moves on, the meshing link plate 111 and the sprocket 120a each move such that the tooth 112 in the meshing position gradually moves to a seating point. Here, since the distance between the seat portion 115a and the flange 122a is set shorter than the distance between the tooth 112 and its seating point on the tooth 121, the seat portion 115a of the connecting link plate 114 abuts on the flange 122a of the sprocket 120a before the tooth 112 moves completely to its seating point on the tooth 121.

This means that the chain 110a can sit on the sprocket 120a without the teeth 112 contacting the teeth 121. Therefore, when a sprocket 120a having tooth roots with various different root circle radii is used, there will be no change in the pitch radius for each tooth root, whereby rotation fluctuations of the chain 110a are minimized and a decrease in power transmission efficiency can be prevented.

When, in particular, a sprocket designed such that the meshing contact point between the chain 110a and the sprocket 120a varies for each pitch is used, the tension on the meshing chain 110a can be reduced. The strength of various components of the chain drive mechanism 100 can accordingly be decreased by the amount of reduced tension, which enables a reduction in weight and cost of the chain drive mechanism 100.

Also, the friction resistance when the chain meshes with the sprocket 120a, or when the chain 110a flexes, or when the chain slides on the shoe, can be reduced.

While the meshing between the chain 110a and the sprocket 120a takes place between the teeth 112 of the meshing link plates 111 and the teeth 121 of the sprocket 120a, the seating of the chain 110a on the sprocket 120a occurs between the seat portions 115a of the connecting link plates 114 and the flanges 122a of the sprocket 120a. Since the chain and the sprocket contact each other at different points when meshing and seating, the teeth 112 and the teeth 121 contact each other less frequently, so that the wear on the tooth surfaces is retarded, and the sprocket 120a and the chain 110a can have longer service life.

Moreover, by using link plates 111 with different shaped teeth 112 in the chain 110a, the meshing impact can be made irregular, whereby noise can be reduced as well as the maximum tension on the chain 110a can be reduced, while also preventing progress of wear on the sprocket 120a or the chain 110a caused by the seating of the chain.

Since the chain 110a is made up of components of a normal chain, with only some parts having different shapes, there will be no large increase in production cost.

Next, chain drive mechanisms 101, 200, and 201 according to other embodiments of the present invention will be described with reference to FIG. 3 to FIG. 8.

Figure 3:
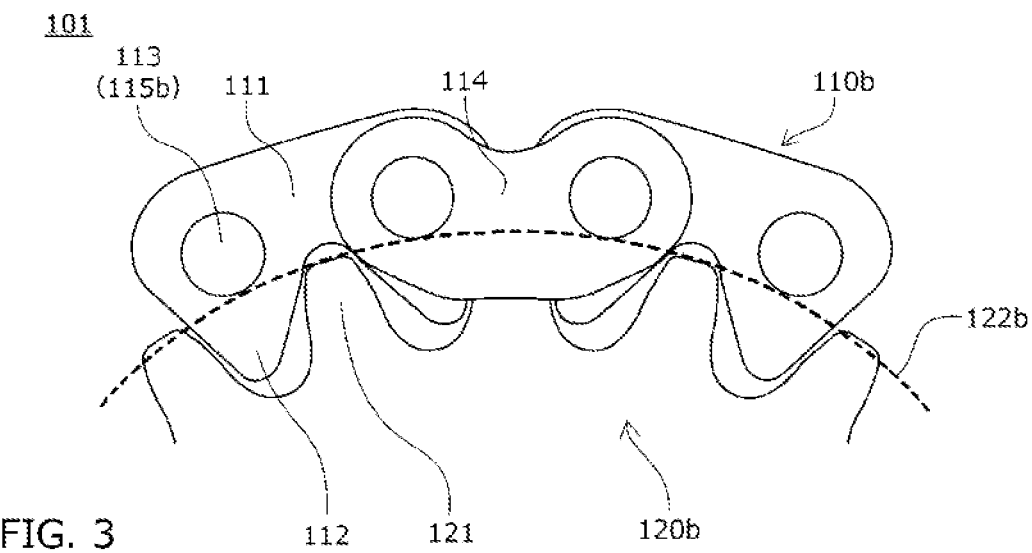
FIG. 3 is a side view illustrating a connecting pin 113 of a chain 110b sitting on a flange 122b of a sprocket 120b in a chain drive mechanism 101 according to one embodiment of the present invention.
Figure 4:
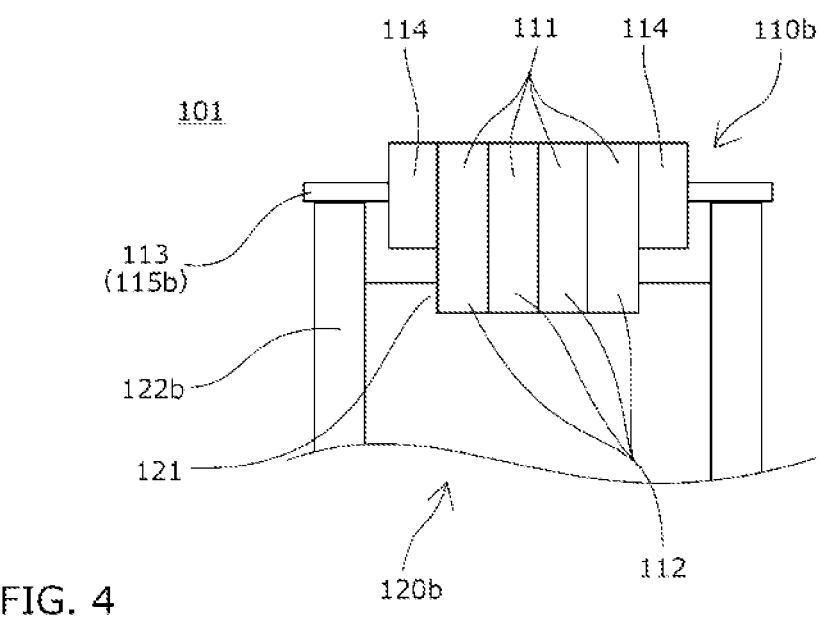
FIG. 4 is a schematic cross-sectional front view illustrating connecting pins 113 of the chain 110b sitting on flanges 122b of the sprocket 120b in the chain drive mechanism 101 according to one embodiment of the present invention.

The chain drive mechanism 101 includes, as shown in FIG. 3 and FIG. 4, a sprocket 120b that has teeth 121 similar to those of the chain drive mechanism 100, and a chain 110b that has a plurality of meshing link plates 111 and connecting link plates 114 similar to those of the chain drive mechanism 100 and is put around the sprocket 120b.

The sprocket 120b includes a pair of flanges 122b protruding circumferentially around the sprocket 120b to sandwich the plurality of teeth 121 from both sides.

The chain 110b is a silent chain having a plurality of meshing link plates 111 and a plurality of connecting link plates 114 alternately arranged and offset by half a pitch along the longitudinal direction of the chain, and bendably coupled together with connecting pins 113.

The connecting pins 113 have a seat portion 115b protruding further outward from the connecting link plates 114.

The distance between the inner side faces of the opposite flanges 122b of the sprocket 120b is set larger than the distance between the outer side faces of the opposite connecting link plates 114 of the chain 110b. The sprocket is configured such that, when the chain 110b is put around the sprocket 120b, the distance between the seat portion 115b and the flange 122b is shorter than the distance between the tooth 112 and its seating point on the tooth 121.

In this chain drive mechanism 101, too, the seat portion 115b abuts on the flange 122b before the tooth 112 moves completely to its seating point on the tooth 121, i.e., the teeth 112 do not sit on the teeth 121, so that, similarly to the chain drive mechanism 100, rotation fluctuations of the chain 110b are minimized and a decrease in power transmission efficiency can be prevented.

Figure 5:
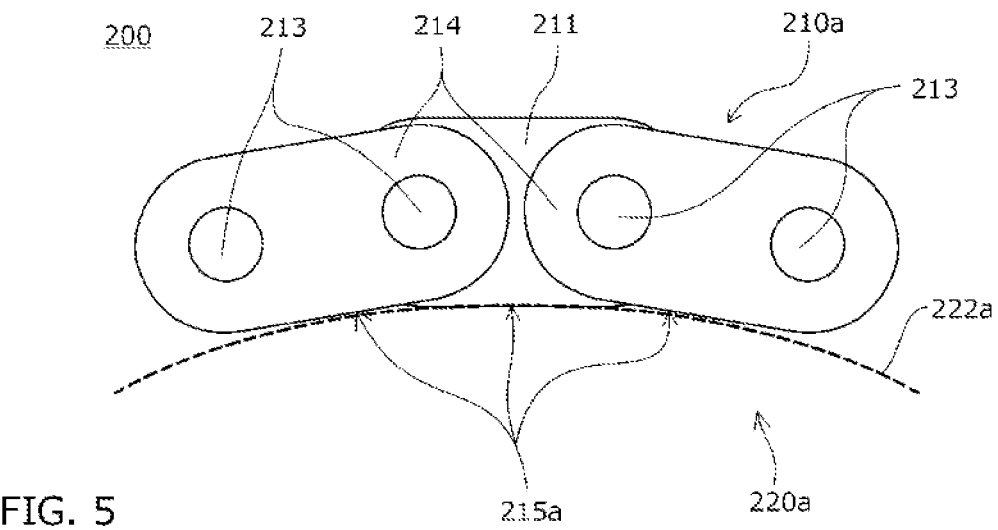
FIG. 5 is a side view illustrating a connecting link plate 214 of a chain 210a sitting on a flange 222a of a sprocket 220a in a chain drive mechanism 200 according to one embodiment of the present invention.
Figure 6:
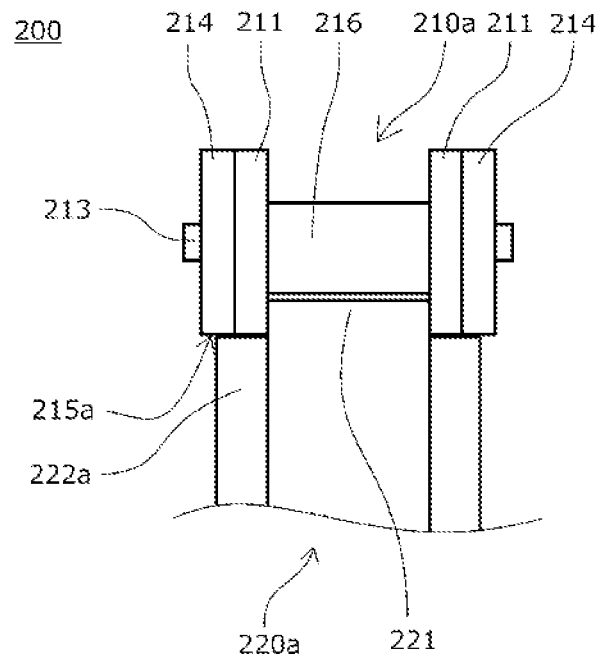
FIG. 6 is a schematic partial cross-sectional front view illustrating connecting link plates 214 of the chain 210a sitting on flanges 222a of the sprocket 220a in the chain drive mechanism 200 according to one embodiment of the present invention.

The chain drive mechanism 200 includes, as shown in FIG. 5 and FIG. 6, a sprocket 220a that has teeth 221 similar to those of the chain drive mechanism 100, and a chain 210a having inner link plates 21i, outer link plates 214, and rollers 216 configured to mesh with the teeth 221, and is to be put around the sprocket 220a.

The sprocket 220a includes a pair of flanges 222a protruding circumferentially around the sprocket 220a to sandwich the plurality of teeth 221 from both sides.

The chain 210a is a roller chain having a plurality of inner link plates 211 and a plurality of outer link plates 214 alternately arranged and offset by half a pitch along the longitudinal direction of the chain, and bendably coupled together with connecting pins 213 that share the same center axis with the rollers 216.

The outer link plate 214 has a seat portion 215a in the lower part.

The distance between the inner side faces of the opposite flanges 222a of the sprocket 220a is set smaller than the distance between the inner side faces of the opposite inner link plates 211 of the chain 210a. The sprocket is configured such that, when the chain 210a is put around the sprocket 220a, the distance between the seat portion 215a and the flange 222a is shorter than the distance between the roller 216 and its seating point on the tooth 221.

Figure 7:
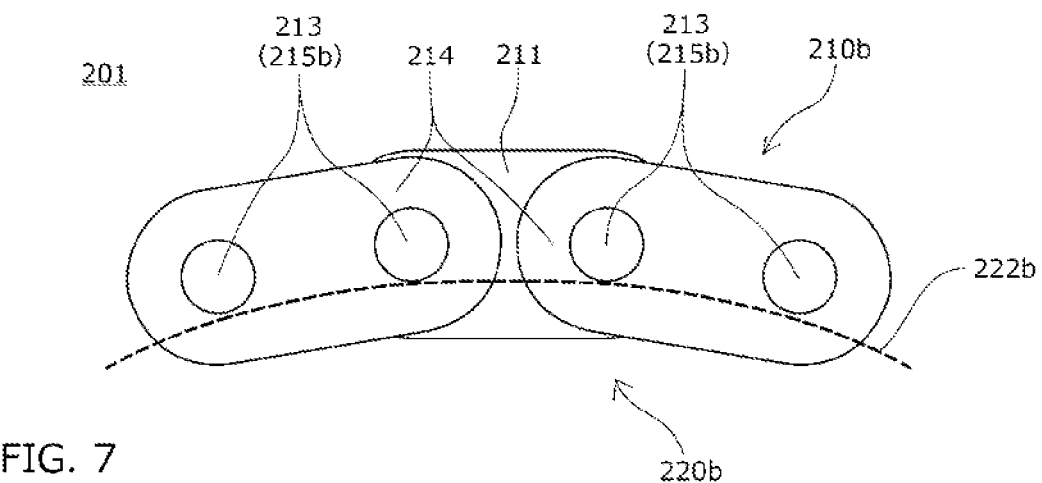
FIG. 7 is a side view illustrating a connecting pin 213 of a chain 210b sitting on a flange 222b of a sprocket 220b in a chain drive mechanism 201 according to one embodiment of the present invention.
Figure 8:
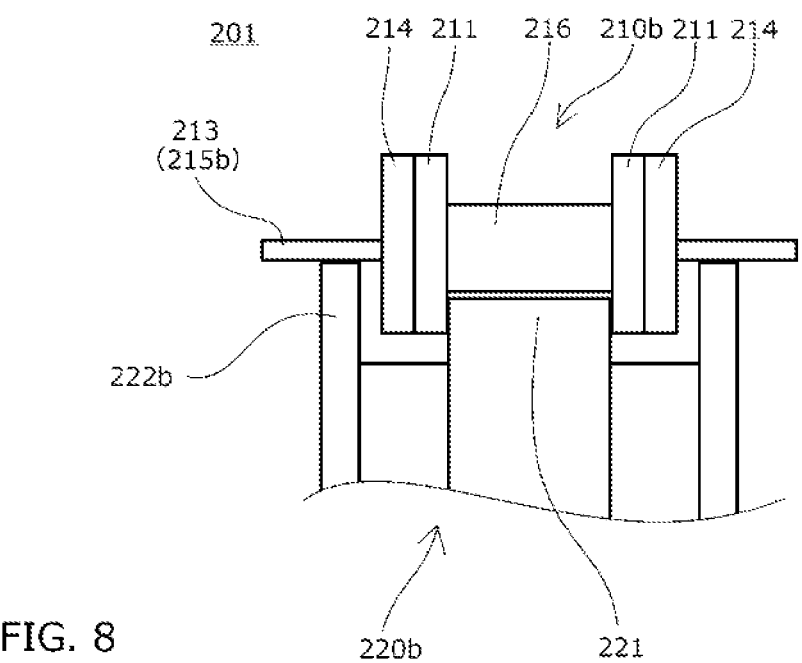
FIG. 8 is a schematic partial cross-sectional front view illustrating connecting pins 213 of the chain 210b sitting on flanges 222b of the sprocket 220b in the chain drive mechanism 201 according to one embodiment of the present invention.

The chain drive mechanism 201 includes, as shown in FIG. 7 and FIG. 8, a sprocket 220b that has teeth 221 similar to those of the chain drive mechanism 200, and a chain 210b having a plurality of inner link plates 211, outer link plates 214, and rollers 216 configured to mesh with the teeth 221 similar to those of the chain drive mechanism 200, and is to be put around the sprocket 220b.

The sprocket 220b includes a pair of flanges 222b protruding circumferentially around the sprocket 220b to sandwich the plurality of teeth 221 from both sides.

The chain 210b is a roller chain having a plurality of inner link plates 211 and a plurality of outer link plates 214 alternately arranged and offset by half a pitch along the longitudinal direction of the chain, and bendably coupled together with connecting pins 213 that share the same center axis with the rollers 216.

The connecting pins have a seat portion 215b protruding further outward from the outer link plates 214.

The distance between the inner side faces of the opposite flanges 222b of the sprocket 220b is set larger than the distance between the outer side faces of the opposite outer link plates 214 of the chain 210b. The sprocket is configured such that, when the chain 210b is put around the sprocket 220b, the distance between the seat portion 215b and the flange 222b is shorter than the distance between the roller 216 and its seating point on the tooth 221.

In these chain drive mechanisms 200 and 201, too, the seat portions 215a and 215b abut on the flanges 222a and 222b before the roller 216 moves completely to its seating point on the tooth 221, i.e., the rollers 216 do not sit on the teeth 221, so that, similarly to the chain drive mechanisms 100 and 101, rotation fluctuations of the chain 210a or 210b are minimized and a decrease in power transmission efficiency can be prevented.

While embodiments of the present invention have been described above in detail, the present invention is not limited to these embodiments and may be carried out with various design changes without departing from the scope of the present invention set forth in the claims.

The seat portions are provided in the lower part of the connecting link plates in some of the embodiments described above. The position of the seat portion is not limited to the lower part. The seat, portion may be provided all around the connecting link plate, for example, or, another seating plate connected with a coupling pin may be provided further on the outer side of the connecting link plate.

The roller chains in some of the above-mentioned embodiments were described as having a plurality of inner link plates and a plurality of outer link plates alternately arranged and offset by half a pitch along the longitudinal direction of the chain, and bendably coupled together with connecting pins that share the same center axis with the rollers. The configuration of the roller chain is not limited to this. For example, instead of providing the connecting pins, the inner link plates and outer link plates may be bendably coupled together with the rollers.

What is claimed is:

1. A chain drive mechanism comprising:
   a sprocket having a plurality of teeth and a pair of flanges protruding circumferentially around the sprocket that sandwich the plurality of teeth therebetween; and
   a chain configured to be put around the sprocket, the chain including a plurality of link plates, pins that rotatably connect the plurality of link plates, and a pair of seat portions on both sides of the chain, the seat portions being a circumferential surface of both ends of the pins so that the flanges abut on the seat portions from a direction orthogonal to a central axis of the sprocket when the chain sits.

2. The chain drive mechanism according to claim 1, wherein the plurality of teeth of the sprocket include teeth with different shapes.

3. The chain drive mechanism according to claim 1, wherein the chain is a silent chain, and the plurality of link plates include link plates having teeth with different shapes.

* * * * *